(12) United States Patent
Kusagur et al.

(10) Patent No.: US 12,451,645 B2
(45) Date of Patent: Oct. 21, 2025

(54) BACKSHELL ADAPTER ASSEMBLY

(71) Applicant: Amphenol Interconnect India Pvt. Ltd., Maharashtra (IN)

(72) Inventors: Chandrashekhar Shivappa Kusagur, Bangalore (IN); Mathew MK Tharakan, Tewksbury, MA (US); Quentin Abraham, Norwood, MA (US); Madhukar Krishnamurthy Cheeklimane, Bangalore (IN)

(73) Assignee: AMPHENOL INTERCONNECT INDIA PVT. LTD., Maharashtra (IN)

( * ) Notice: Subject to any disclaimer, the term of this patent is extended or adjusted under 35 U.S.C. 154(b) by 428 days.

(21) Appl. No.: 18/077,796

(22) Filed: Dec. 8, 2022

(65) Prior Publication Data
US 2024/0195162 A1 Jun. 13, 2024

(51) Int. Cl.
*H01R 13/58* (2006.01)

(52) U.S. Cl.
CPC .............................. *H01R 13/5841* (2013.01)

(58) Field of Classification Search
None
See application file for complete search history.

(56) References Cited

U.S. PATENT DOCUMENTS

| | | |
|---|---|---|
| 2,671,127 A | 3/1954 | Hope |
| 3,603,913 A | 9/1971 | Hasty, Jr. |
| 3,732,527 A | 5/1973 | Mcknight |
| 3,781,762 A | 12/1973 | Quackenbush |
| 4,135,776 A | 1/1979 | Ailawadhi et al. |
| 4,255,011 A | 3/1981 | Davis et al. |
| 4,564,255 A | 1/1986 | Kirma |
| 4,761,146 A | 8/1988 | Sohoel |
| 4,901,608 A | 2/1990 | Shieh |
| 5,580,278 A | 12/1996 | Fowler et al. |
| 6,095,828 A | 8/2000 | Burland |
| 6,162,095 A | 12/2000 | Holman |

(Continued)

FOREIGN PATENT DOCUMENTS

| | | |
|---|---|---|
| CA | 2969975 A1 | 2/2017 |
| DE | 3135781 A1 | 3/1983 |

(Continued)

OTHER PUBLICATIONS

EP Communication; Extended European Search Report; Application No. 23215051.6-1201; mailed May 22, 2024; pp. 1-8.

(Continued)

*Primary Examiner* — Ross N Gushi
(74) *Attorney, Agent, or Firm* — CANTOR COLBURN LLP

(57) ABSTRACT

A backshell adapter assembly includes a coupling member, a ferrule positionable at least partially within the coupling member, and an adapter body including at least one support arm. At least one swing arm is connectable to the at least one support arm. The at least one swing arm is positionable relative to the at least one support arm at a plurality of distinct configurations. One of the at least one support arm and the at least one swing arm has a single recess formed therein and the other of the at least one support arm and the at least one swing arm has at least one protrusion extending therefrom. The at least one protrusion is receivable within the single recess.

20 Claims, 13 Drawing Sheets

(56) References Cited

U.S. PATENT DOCUMENTS

| | | | |
|---|---|---|---|
| 6,220,889 | B1 | 4/2001 | Ely et al. |
| 6,419,519 | B1* | 7/2002 | Young ............... H01R 13/5812 |
| | | | 439/446 |
| D473,849 | S | 4/2003 | Yeh |
| 7,544,085 | B2 | 6/2009 | Baldwin et al. |
| 7,837,495 | B2* | 11/2010 | Baldwin ............. H01R 13/622 |
| | | | 439/459 |
| 7,862,369 | B2 | 1/2011 | Gimenes et al. |
| 9,413,116 | B1 | 8/2016 | Villasenor et al. |
| 9,627,800 | B2* | 4/2017 | Taylor ................ H01R 13/5841 |
| D789,893 | S | 6/2017 | Shibata |
| 10,777,955 | B2* | 9/2020 | Kraus .................. H01R 13/627 |
| 10,995,788 | B2* | 5/2021 | Dilling .................. F16B 23/003 |
| 11,491,928 | B2* | 11/2022 | Menez .............. H01R 13/5841 |
| 2009/0130894 | A1 | 5/2009 | Baldwin et al. |
| 2010/0124837 | A1 | 5/2010 | Gimenes et al. |
| 2016/0365669 | A1 | 12/2016 | Wade et al. |

FOREIGN PATENT DOCUMENTS

| | | | |
|---|---|---|---|
| EP | 3332455 | B1 | 10/2020 |
| JP | 2001304488 | A | 10/2001 |
| JP | 2007188838 | A | 7/2007 |
| WO | 2009055681 | A2 | 4/2009 |
| WO | 2016200697 | A1 | 12/2016 |
| WO | 2017023491 | A1 | 2/2017 |

OTHER PUBLICATIONS

PT06E-16-26S SR Amphenol Socapex. Date: Not listed. [online]. [Site visited Jan. 14, 2025]. Available from Internet URL: https://in.rsdelivers.com/producUamphenol-socapex/pto6e-16-26ssr/amphenol-socapex-pt-copper-alloy-26-way-cable-mi1/8721663 (Year: 2025); pp. 1-6.

International Preliminary Report on Patentability for International Application No. PCT/US2008/081131; International Filing Date: Oct. 24, 2008; Date of Mailing: Jun. 30, 2009; 7 pages.

International Search Report for International Application No. PCT/US2008/081131; International Filing Date: Oct. 24, 2008; Date of Mailing: Jun. 30, 2009; 3 pages.

Written Opinion for International Application No. PCT/US2008/081131; International Filing Date: Oct. 24, 2008; Date of Mailing: Jun. 30, 2009; 6 pages.

* cited by examiner

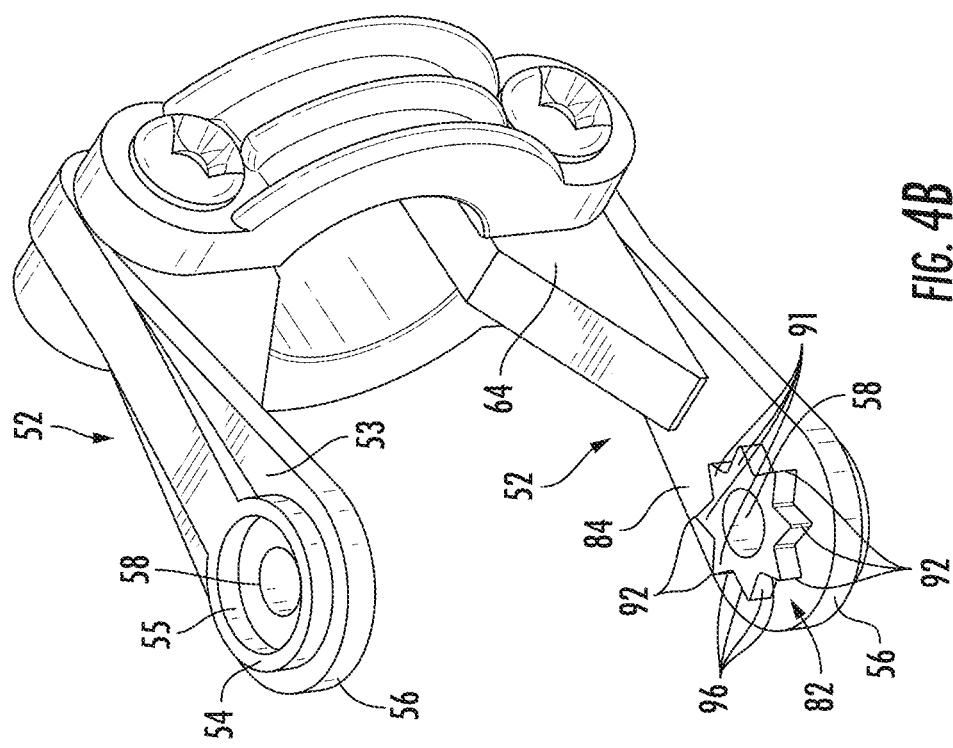
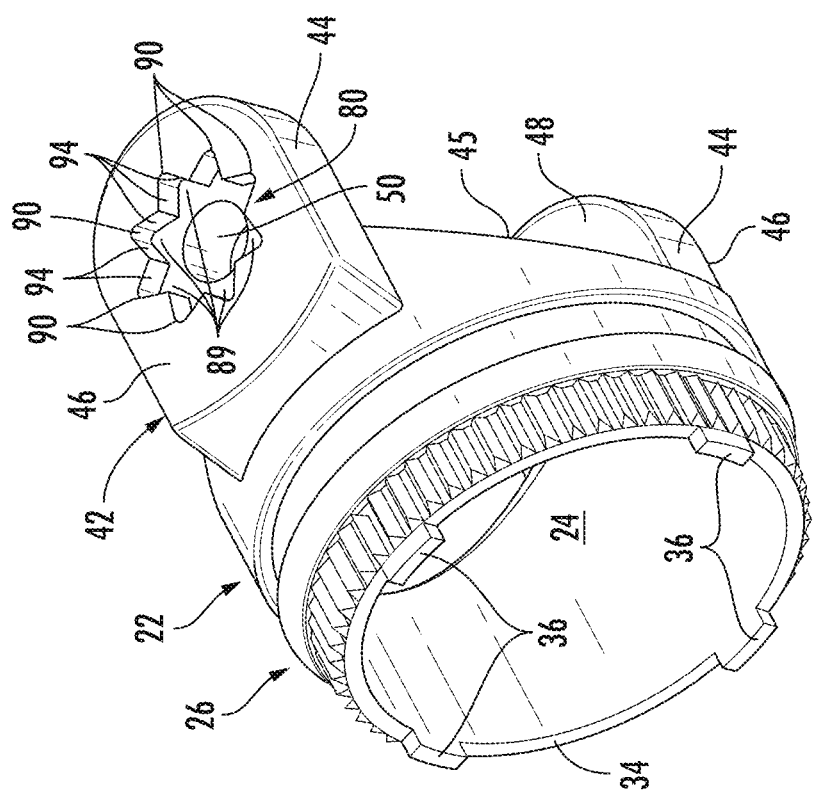
FIG. 4B
FIG. 4A

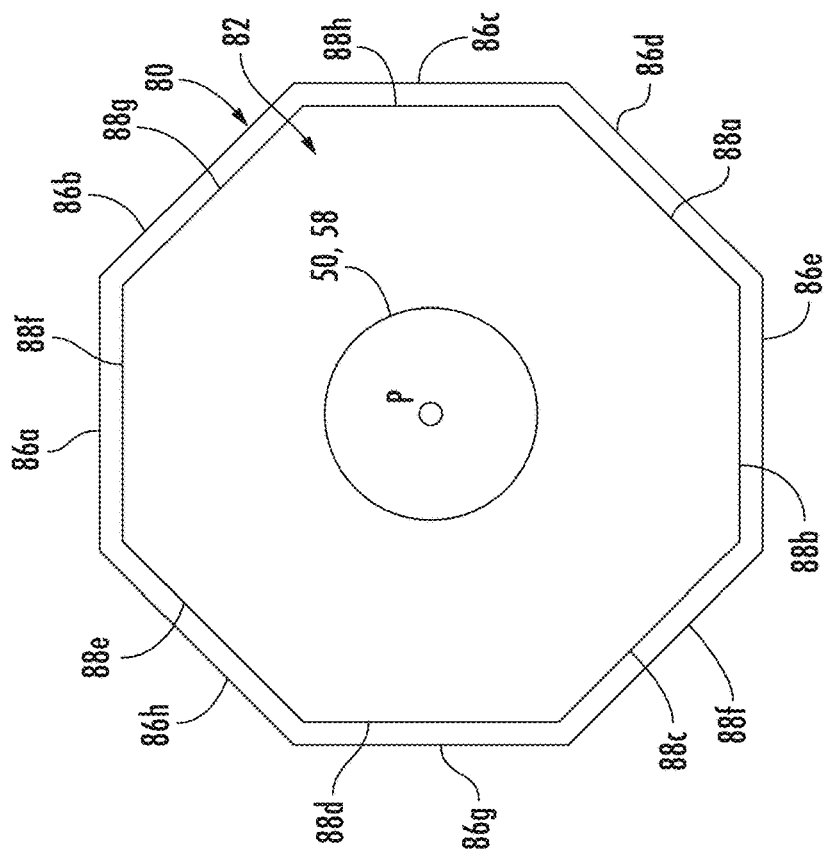
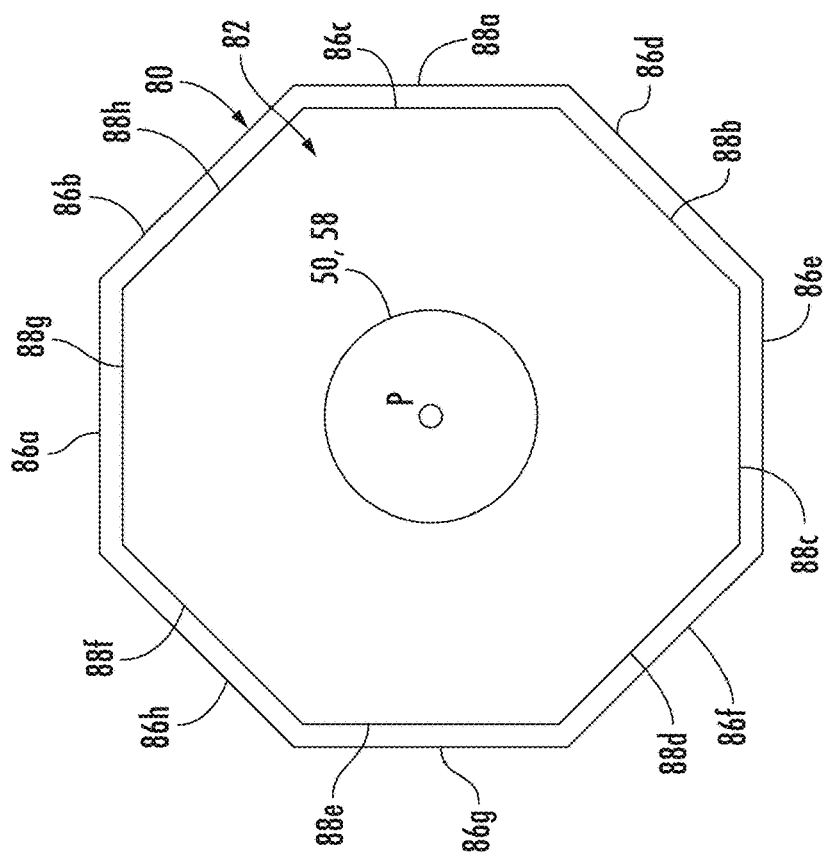

BACKSHELL ADAPTER ASSEMBLY

BACKGROUND

Backshell adapter assemblies are used at a transition from one or more cables to a connector. For example, backshell adapter assemblies can provide a radial clamping force relative to a cable to prevent axial forces from damaging the termination of the cable at the connector.

BRIEF DESCRIPTION

According to an embodiment, a backshell adapter assembly includes a coupling member, a ferrule positionable at least partially within the coupling member, and an adapter body including at least one support arm. At least one swing arm is connectable to the at least one support arm. The at least one swing arm is positionable relative to the at least one support arm at a plurality of distinct configurations. One of the at least one support arm and the at least one swing arm has a single recess formed therein and the other of the at least one support arm and the at least one swing arm has at least one protrusion extending therefrom. The at least one protrusion is receivable within the single recess.

In addition to one or more of the features described herein, or as an alternative, in further embodiments the plurality of different configurations are arranged about a pivot axis.

In addition to one or more of the features described herein, or as an alternative, in further embodiments the at least one swing arm is positionable relative to the at least one support arm between eight configurations.

In addition to one or more of the features described herein, or as an alternative, in further embodiments the adapter body has a longitudinal axis. The at least one swing arm is arranged at a distinct angle relative to the longitudinal axis in each of the plurality of different configurations.

In addition to one or more of the features described herein, or as an alternative, in further embodiments the at least one protrusion is a single protrusion and a configuration of the single recess is identical to a configuration of the single protrusion.

In addition to one or more of the features described herein, or as an alternative, in further embodiments the single recess is polygonal in shape.

In addition to one or more of the features described herein, or as an alternative, in further embodiments the single recess is octagonal in shape.

In addition to one or more of the features described herein, or as an alternative, in further embodiments the single recess is a star shape including a plurality of identical radially extending features.

In addition to one or more of the features described herein, or as an alternative, in further embodiments the single recess is formed in an outwardly facing surface of the at least one support arm.

In addition to one or more of the features described herein, or as an alternative, in further embodiments the single recess is formed in an inwardly facing surface of the at least one support arm.

In addition to one or more of the features described herein, or as an alternative, in further embodiments the at least one support arm includes a plurality of support arms and the at least one swing arm includes a plurality of swing arms.

According to an embodiment, a backshell adapter assembly includes a coupling member, a ferrule positionable at least partially within the coupling member, and an adapter body including at least one support arm. At least one swing arm is connectable to the at least one support arm. The at least one swing arm is positionable relative to the at least one support arm at a plurality of distinct configurations. One of the at least one support arm and the at least one swing arm has at least one recess formed therein and the other of the at least one support arm and the at least one swing arm has a single protrusion extending therefrom. The single protrusion is receivable within the at least one recess.

In addition to one or more of the features described herein, or as an alternative, in further embodiments the plurality of different configurations are arranged about a pivot axis.

In addition to one or more of the features described herein, or as an alternative, in further embodiments the at least one swing arm is positionable relative to the at least one support arm between eight configurations.

In addition to one or more of the features described herein, or as an alternative, in further embodiments the adapter body has a longitudinal axis and the at least one swing arm is arranged at a distinct angle relative to the longitudinal axis in each of the plurality of different configurations.

In addition to one or more of the features described herein, or as an alternative, in further embodiments the single protrusion is polygonal in shape.

In addition to one or more of the features described herein, or as an alternative, in further embodiments the single protrusion is octagonal in shape.

In addition to one or more of the features described herein, or as an alternative, in further embodiments the single protrusion is a star shape including a plurality of substantially identical radially outwardly extending portions.

According to an embodiment, a backshell adapter assembly includes an adapter body including at least one support arm and at least one swing arm connectable to the at least one support arm. The at least one swing arm is positionable relative to the at least one support arm at a plurality of distinct configurations. The at least one swing arm has a support surface. At least one protrusion extends from the support surface. The at least one protrusion includes a plurality of walls and at least one of the plurality of walls is arranged at a non-perpendicular angle to the support surface.

In addition to one or more of the features described herein, or as an alternative, in further embodiments the plurality of walls further comprises a first wall arranged at a first non-perpendicular angle relative to the support surface and a second wall arranged at a second non-perpendicular angle relative to the support surface.

In addition to one or more of the features described herein, or as an alternative, in further embodiments a vertex is formed between the first wall and the second wall.

In addition to one or more of the features described herein, or as an alternative, in further embodiments the vertex has a linear configuration.

In addition to one or more of the features described herein, or as an alternative, in further embodiments the first wall and the second wall are truncated and the vertex is a vertex wall extending between the first wall and the second wall.

In addition to one or more of the features described herein, or as an alternative, in further embodiments the vertex wall has a curved configuration.

In addition to one or more of the features described herein, or as an alternative, in further embodiments the vertex wall is has a planar configuration.

In addition to one or more of the features described herein, or as an alternative, in further embodiments the at least one protrusion further comprises a plurality of protrusions and the plurality of protrusions are identical.

In addition to one or more of the features described herein, or as an alternative, in further embodiments the at least one swing arm further comprises an aperture. The plurality of protrusions are equidistantly spaced about the aperture.

In addition to one or more of the features described herein, or as an alternative, in further embodiments the at least one support arm further comprises at least one recess. The at least one protrusion is receivable within the at least one recess.

In addition to one or more of the features described herein, or as an alternative, in further embodiments the at least one recess further comprises a plurality of recesses and each of the plurality of recesses is identical.

BRIEF DESCRIPTION OF THE DRAWINGS

The following description of the figures should not be considered limiting. With reference to the accompanying drawings:

FIG. 4A is a perspective view of an adapter body having a single recess formed in a support arm according to another embodiment;

FIG. 4B is a perspective view of a swing arm having a single protrusion according to another embodiment;

FIGS. 7A-7D are sectional view of the interface between of a single protrusion of the swing arm engaged with a single recess of the support arm in different configurations according to an embodiment;

DETAILED DESCRIPTION

A detailed description of one or more embodiments of a backshell adapter assembly are presented herein by way of example and not limitation with reference to the Figures.

Figure 1:
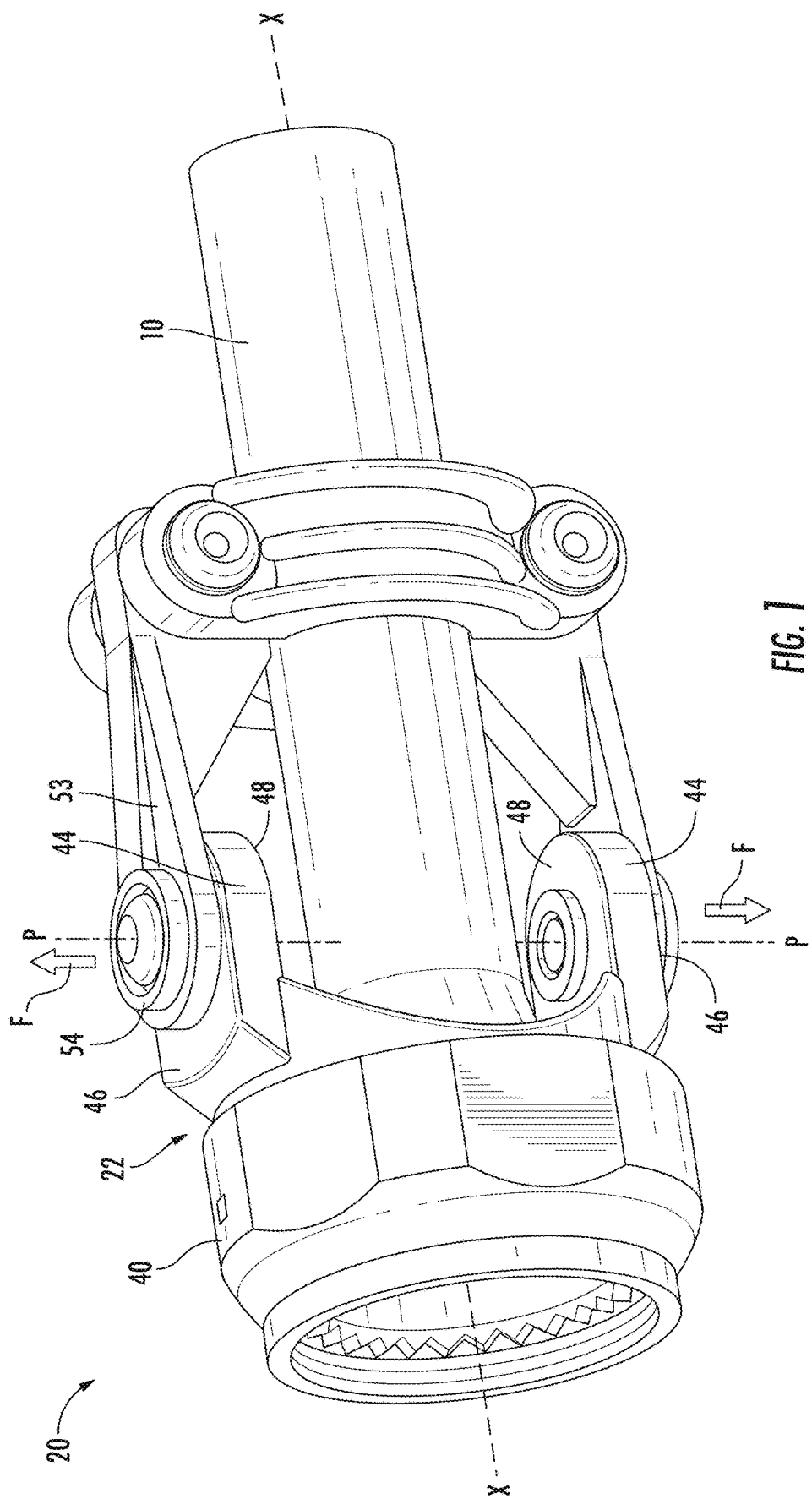
FIG. 1 is a perspective view of a backshell adapter assembly according to an embodiment.
Figure 2:
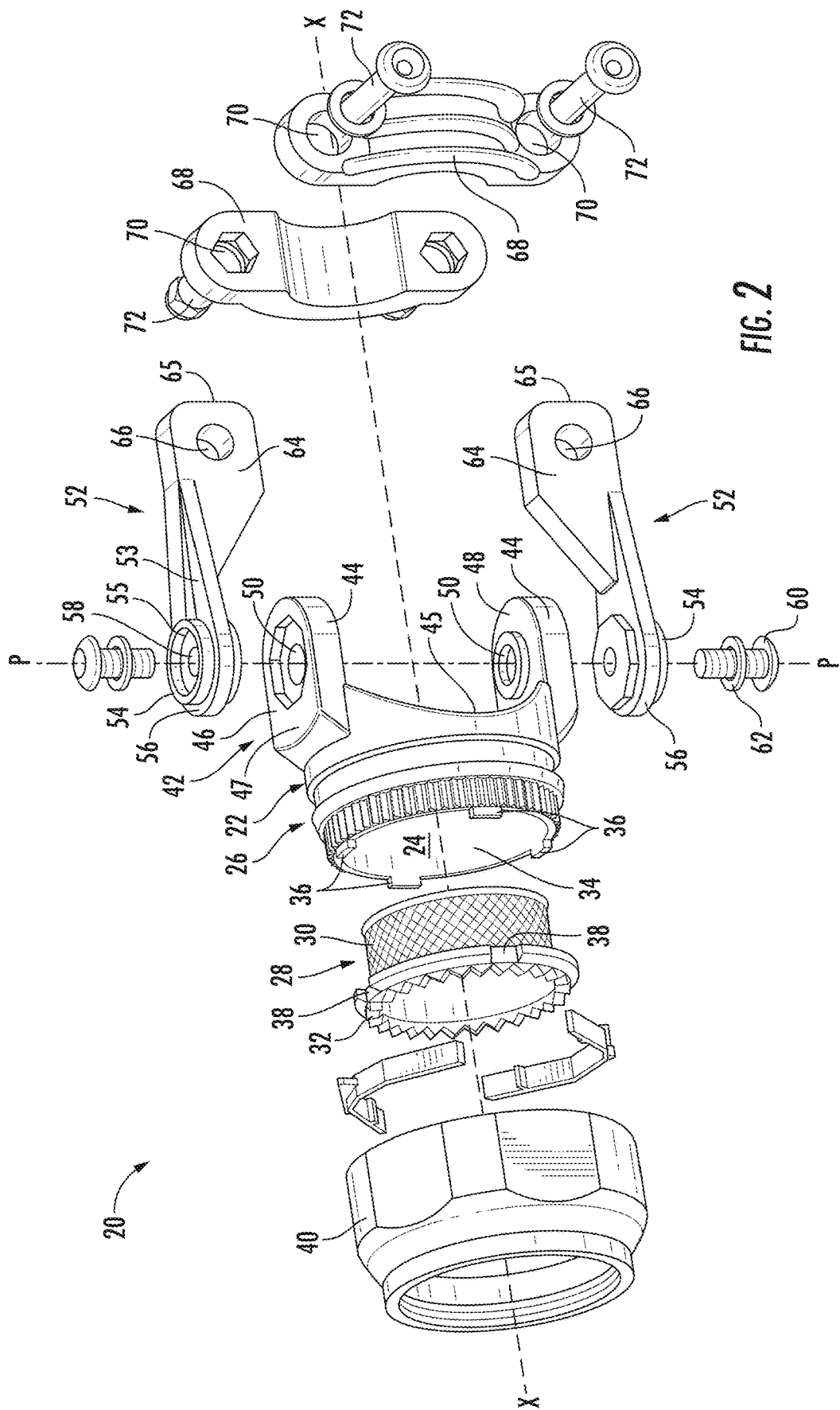
FIG. 2 is an exploded perspective view of the backshell adapter assembly of FIG. 1 according to an embodiment.
Figure 3B:
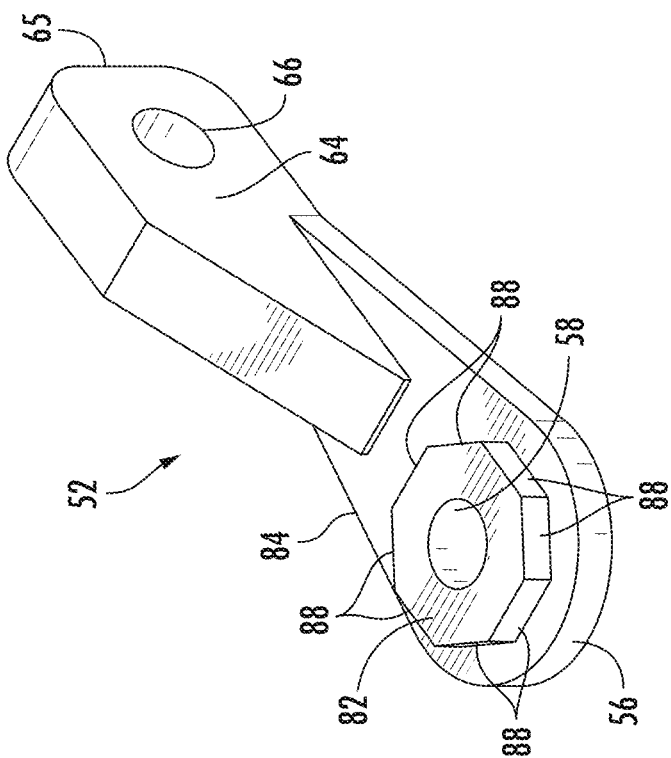
FIG. 3B is a perspective view of a swing arm having a single protrusion according to an embodiment.
Figure 3A:
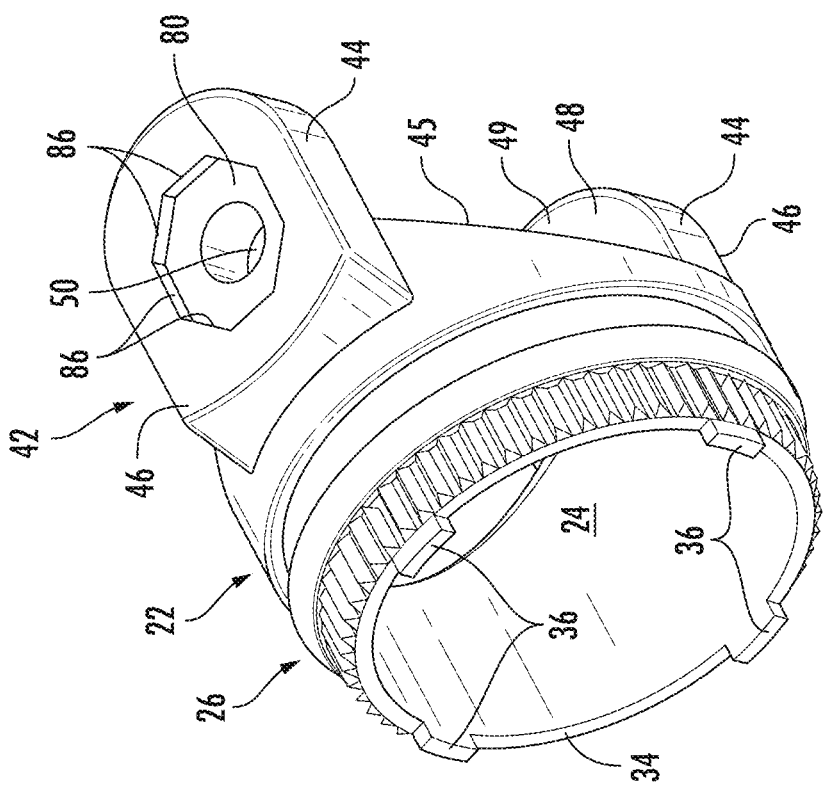
FIG. 3A is a perspective view of an adapter body having a single recess formed in a support arm according to an embodiment.

With reference to FIGS. 1 and 2, an example of a backshell adapter assembly 20 is illustrated according to an embodiment. As shown, the backshell adapter assembly 20 includes an adapter body 22 (best shown in FIG. 2) having a opening 24 configured to receive a conductor, wire bundle, cable, conduit, or other member 10 therein. The adapter body 22 may be formed from any suitable material, including but not limited to aluminum, steel, a composite or plastic, or any combination thereof.

In the illustrated, non-limiting embodiment of FIGS. 1 and 2, the adapter body 22 includes a first portion 26 having an annular or ring shape. However, embodiments where the first portion 26 is another shape, such as a rectangular, square, oval, or a polygonal shape for example, are also contemplated herein. The first portion 26 of the adapter body 22 may be configured to receive or accommodate a connector interface ferrule 28. As best shown in FIG. 2, in an embodiment, the connector interface ferrule 28 includes an annular body 30 (or other body shape corresponding to the shape of the first portion 26) having a radially outwardly extending flange 32 located at an end of the annular body 30. In an embodiment, the outer diameter of the annular body 30 is less than or equal to the inner diameter of the opening 24 of the first portion 26 of the adapter body 22, and the outer diameter of the radial flange 32 is equal to or greater than the diameter of the opening 24 of the first end 34 of the first portion 26 of the adapter body 22. In the embodiment illustrated in FIGS. 1 and 2, for example, the outer diameter of the radial flange 32 is greater than the diameter of the opening 24. Accordingly, when the connector interface ferrule 28 is positioned relative to the adapter body 22, the annular body 30 is arranged at least partially within the opening 24 and the radial flange 32 is positioned in contact with a first end 34 of the adapter body 22. However, in other embodiments, the connector interface ferrule 28 may be integrated into the first portion 26 of the adapter body 22 rather than being a separate element as shown in FIGS. 1 and 2.

Engagement between the connector interface ferrule 28 and the adapter body 22 may restrict relative rotation therebetween, thereby limiting rotation of the cable 10 relative to the backshell adapter assembly 20. As shown, at least one tab 36 may protrude from the first end 34 of the adapter body 22. In an exemplary embodiment, such a tab 36 may protrude parallel to a centrally located longitudinal axis X of the backshell adapter assembly 20. In the illustrated, non-limiting embodiment, the at least one tab 36 is a plurality of tabs, such as four tabs for example, spaced equidistantly about the periphery of the first end 34. However, embodiments where the plurality of tabs 36 are spaced non-uniformly are also contemplated herein. As is also shown, the radial flange 32 may additionally include a plurality of axial slots 38 formed therein, the location, total number, or both location and total number of the axial slots 38 may correspond to the plurality of tabs 36. For example, the total number of slots 38 may be being equal to or greater than the total number of tabs 36. Accordingly, when the connector interface ferrule 28 is positioned adjacent to the first end 34 of the adapter body 22, the one or more tabs 36 are received within the one or more corresponding slots 38. Although the tabs 36 and slots 38 are illustrated and described as being positioned at the first end 34 of the adapter body 22 and at the radial flange 32, respectively, it should be understood that in other embodiments such tabs 36 and slots 38 may be arranged at another location, such as at the interior surface of the opening 24 of the first portion 26 and about the annular body 30 for example. Further, it should be appreciated that in other embodiments, the tabs 36 may be formed at the connector interface ferrule 28 and the slots 38 may be formed at the first portion 26 of the adapter body 22. In addition, other mechanisms besides or in addition to tabs and slots can be used to restrict relative rotation between the connector interface ferrule 28 and the adapter body 22, such as, but not limited to, pins and openings, protrusions and detents.

A coupling member 40 is connectable to the adapter body 22. For example, the coupling member 40 may be a nut that is connectable to the first portion 26 of the adapter body 22. When the coupling member 40 is connected to the first portion 26 of the adapter body 22, the coupling member 40 holds the connector interface ferrule 28 in place between the coupling member 40 and the adapter body 22. As shown, the coupling member 40 is positionable in axially overlapping arrangement with the connector interface ferrule 28 and the first end 34 of the adapter body 22 to restrict axial movement of the connector interface ferrule 28 along the longitudinal axis X with respect to the adapter body 22.

The adapter body 22 additionally includes a second portion 42 coupled to or integrally formed with the first portion 26. In an embodiment, the second portion 42 of the adapter body 22 includes at least one support arm 44. As shown, the at least one support arm 44 may extend beyond a distal end 45 of the first portion 26 of the adapter body 22. In the illustrated, non-limiting embodiment, the at least one support arm 44 includes a plurality of support arms, such as two support arms 44 equidistantly spaced from one another about the periphery of the first portion 26. However, it should be understood that embodiments including a single support arm 44 or more than two support arms 44 are also within the scope of this disclosure. In some embodiments, the supports arms 44 may be spaced non-equidistantly from one another.

In embodiments including a plurality of support arms 44, the plurality of support arms 44 may be substantially identical or may be different. For example, in the embodiment illustrated in FIG. 2, each support arm 44 includes a first, outwardly facing surface 46 and an opposite second, inwardly facing surface 48. In an embodiment, the first surface 46 of each support arm 44 includes a generally planar portion 47. The support arms 44 may extend away from the first portion 26 of the adapter body in a direction that is substantially parallel to the longitudinal axis X of the adapter body 22. Alternatively, or in addition, the second surface 48 of each support arm 44 may have a generally planar portion 49 that is parallel to the generally planar portion 47 of the first surface 46. As shown, the first support arm 44 and the second support arm 44 are provided with aligned openings 50 that define a pivot axis P. In the illustrated, non-limiting embodiment, the pivot axis P is oriented orthogonally or substantially orthogonally to the longitudinal axis X, but other orientations are within the scope of this disclosure.

The backshell adapter assembly 20 additionally includes at least one swing arm 52, and in some embodiments, a plurality of swing arms 52. The at least one swing arm 52 is connectable to a corresponding support arm 44. Although the swing arm 52 is illustrated as being positioned adjacent to the first, outwardly facing surface 46 of the support arm 44, it should be understood that in other embodiments, the swing arm 52 may be positioned adjacent to the second, inwardly facing surface 48 of the support arm 44.

The swing arm 52 is rotatable relative to the support arm 44 about the pivot axis P. In an embodiment, the swing arm 52 is positionable at a plurality of orientations relative to the support arm 44. For example, the swing arm 52 may be positionable at a plurality of radial orientations about the pivot axis P. In some embodiments, for example, the swing arm 52 is positionable based on the interaction between a protrusion 82 of the swing arm 52 and a recess 80 of the support arm 44, for example, in a plurality of distinct configurations, as will be described in more detail below. As shown, each swing arm 52 may include a hub 54. The hub 54 may be arranged near a first end 56 of the swing arm 52 and may protrude from a first surface 53 of the swing arm 52. The swing arm 52 may also include an aperture 58 located within the interior of the hub 54. When the swing arm 52 is connected to the support arm 44, the aperture 58 is axially aligned with the opening 50 of a respective support arm 44 along axis P. A fastener 60, such as but not limited to a bolt, threaded screw, rivet, pin, or other suitable fastener, couples each swing arm 52 to a respective support arm 44. In an embodiment, a biasing member 62, such as a compression washer or a compression spring for example, is positioned between the fastener 60 and the swing arm 52. The biasing member 62 may be receivable within a recess 55 (see FIGS. 2 and 4B) in the hub 54. In an embodiment, the biasing force of the biasing member 62 is configured to urge the swing arm 52 towards and into engagement with the corresponding support arm 44.

In the illustrated, non-limiting embodiment, the at least one swing arm 52 includes a flange 64 arranged at a second end 65 thereof. When the swing arm 52 is mounted to the support arm 44 of the adapter body 22, the flange 64 extends generally perpendicularly to the generally planar portion 47 of the first surface 46, such that it extends towards the central axis X for example. The flange 64 may have a mounting opening 66 formed therein for securing opposing saddle bars 68 using fasteners 72. The saddle bars 68 may have apertures 70 configured to align with the mounting openings 66 of the flanges 64 such that the saddle bars 68 may be secured to a pair of swing arms 52 with suitable fasteners 72. When the saddle bars 68 are attached to the opposite sides of the flanges 64, the saddle bars 68 cooperate to surround or enclose, and apply an axial force to, the member 10 therein.

As previously noted, the swing arms 52 are positionable relative to the support arms 44 at a plurality of distinct configurations or positions, such as radial positions about the pivot axis P. FIGS. 3A-5B illustrate embodiments of the interface between a swing arm 52 and an adjacent support arm 44 in more detail. As shown, at least one recess 80 is formed in the first, outwardly facing surface 46 of the support arm 44, surrounding the opening 50. Similarly, a second surface 84 of each swing arm 52, also referred to herein as a support surface, includes at least one protrusion 82. The at least one protrusion 82 is configured to face a corresponding support arm 44, such as near the first end 56 thereof for example. The at least one protrusion 82 may be formed about the aperture 58.

The at least one protrusion 82 may be generally complementary to the at least one recess 80 to allow the swing arm 52 to be positionable relative to the corresponding support arm 44 at a plurality of distinct configurations or positions. In an embodiment, a size and shape of the at least one protrusion 82 (in plan view) is substantially identical to, or slightly smaller than, the size and shape of the at least one recess 80 (in plan view) such that the protrusion 82 is receivable within the recess 80. Further, a height of the at least one protrusion 82, measured along the pivot axis P, may be substantially identical to, smaller, or larger than a depth of the at least one recess 80, measured along the pivot axis P. In such embodiments, the support surface 84 of the swing arm 52 is arranged in direct contact with the first surface 46 of the support arm 44 when the protrusion 82 is positioned in the recess 80. However, embodiments where the support surface 84 of the swing arm 52 is offset from the first surface 46 of the support arm 44 when the protrusion 82 is positioned in the recess 80 are also contemplated herein. Further, the depth of the at least one recess 80 may be uniform about each recess, and the height of the at least one protrusion 82 may be uniform about the each protrusion 82. However, embodiments where the depth of the at least one recess 80 varies about the recess are also contemplated herein. The height of the corresponding protrusion 82 may vary about the protrusion in a complementary manner to the recess 80 such that the protrusion and the recess are matable to position the swing arm 52 at a plurality of distinct configurations or positions with respect to the support arm 44.

In the illustrated, non-limiting embodiment of FIGS. 3A-5B, the at least one recess 80 is a single recess. In such embodiments, the at least one protrusion 82 may be a single protrusion, or may include a plurality of separate or distinct protrusions 82 (see, for example, the protrusions 82 in FIG. 6). The at least one recess 80 and the at least one protrusion 82 may have a generally polygonal configuration including a plurality of walls or sides or may be any other suitable shape for positioning the swing arm 52 at a plurality of distinct configurations or positions with respect to the support arm 44 when the protrusion and the recess are mated. In the non-limiting embodiment of FIGS. 3A and 3B, the single recess 80 and the single protrusion 82 are octagonal in shape (in plan view). Accordingly, the recess 80 is formed with eight identical walls 86 extending substantially perpendicular to the first surface 46. In other embodiments, the eight walls 86 may extend at other angles to the first surface 46, and the recess 80 may have a corresponding shape. Each wall 86 is arranged at an angle to the two walls connected thereto and is arranged generally parallel to a wall 86 disposed directly opposite therefrom. Similarly, the protrusion 82 includes eight identical walls 88 extending substantially perpendicularly from the support surface 84 (or at another angle in other embodiments). Each of the walls 88 of the protrusion 82 is arranged at an angle to the two walls connected at the sides thereof and is arranged generally parallel to a wall 88 disposed directly opposite therefrom. It should be understood that a recess 80 and protrusion 82 having any number of walls or sides, such as two, three, four, five, six, seven, or more than eight walls are also within the scope of this disclosure.

Figure 4C:
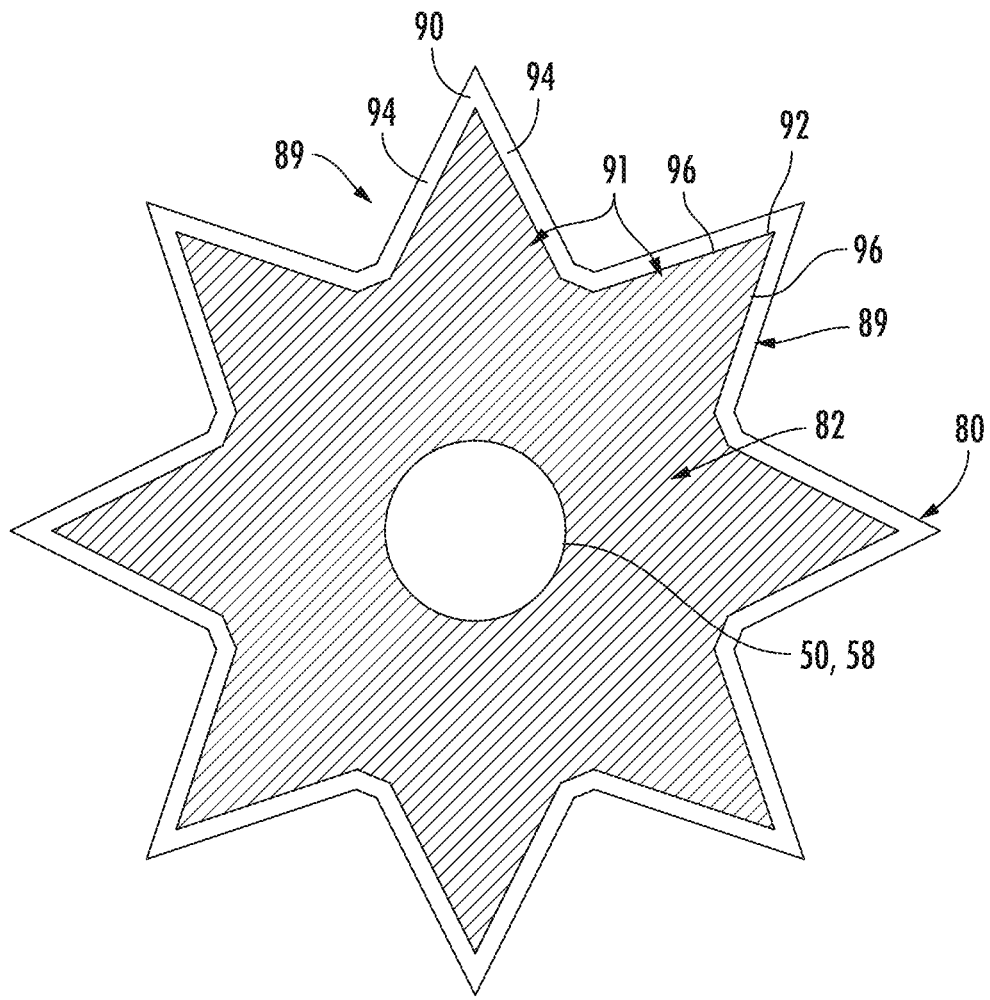
FIG. 4C is a sectional view of the interface between a single protrusion of the swing arm engaged with a single recess of the support arm according to an embodiment.

In another embodiment, as shown in FIGS. 4A-4C, the at least one recess 80 has a plurality of connected radially extending features 89 spaced about the opening 50. The radially extending features may be substantially identical, for example. In the illustrated, non-limiting embodiment, each feature 89 includes a vertex 90. The vertex 90 may be radially outwardly facing with respect to the axis P. The at least one protrusion 82 additionally includes at least one radially extending portion 91 similarly having a radially outwardly facing vertex 92 that is generally complementary in size and shape to one or more of the plurality of vertices 90 of the recess 80. In an embodiment, the protrusion 82 includes a plurality of substantially identical radially extending portions 91. In the embodiment illustrated in FIG. 4B, for example, the protrusion 82 includes the same number of features 89 as formed in the recess 80 of FIG. 4A. In such embodiments, both the recess 80 and the protrusion 82 may be considered to have a star shape (in plan view), and each portion 91 of the protrusion 82 is receivable within a corresponding feature 89 of the recess 80 (see FIG. 4C). Although a recess 80 and protrusion 82 having eight features 89 and portions 91 is illustrated in FIGS. 4A-4C, it should be understood that a recess 80 and protrusion 82 having any number of corresponding features 89 and portions 91 such as two, three, four, five, six, seven, or more than eight features 89 and portions 91 are also within the scope of this disclosure.

It should also be understood that embodiments where the total number of portions 91 or vertices 92 of the at least one protrusion 82 is less than the total number of features 89 or vertices 90 of the at least one recess 80 are also contemplated herein. An embodiment with, for example, eight features 89 of the recess 80 could allow for protrusions 82 with eight or less portions 91 to be receivable within the recess 80. Indeed, in the exemplary embodiment shown in FIG. 5A, for example, a recess 80 with any desired number of features 89 and/or vertices 90 could be compatible with and receive a protrusion 82 with any lesser number of portions 91 and/or vertices 92. For example, the portions 91 and/or vertices 92 of the protrusion 82 may be spaced similarly to the features 89 and/or vertices 90 of the recess 80. For example, as shown in FIG. 5A, the at least one protrusion 82 includes only two portions 91 and each portion is receivable within a plurality, and in some embodiments each of, the plurality of features 89 to allow the swing arm 52 to be positionable relative to the corresponding support arm 44 at a plurality of distinct configurations or positions.

Figure 5B:
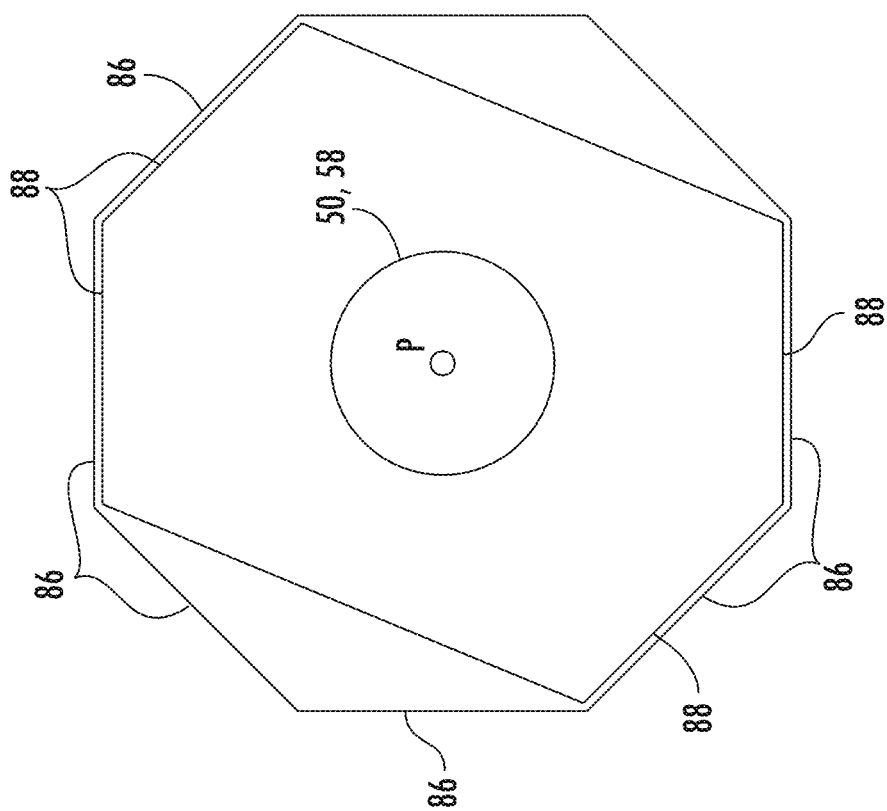
FIG. 5B is a sectional view of the interface between a single protrusion of the swing arm engaged with a single recess of the support arm according to another embodiment.
Figure 5A:
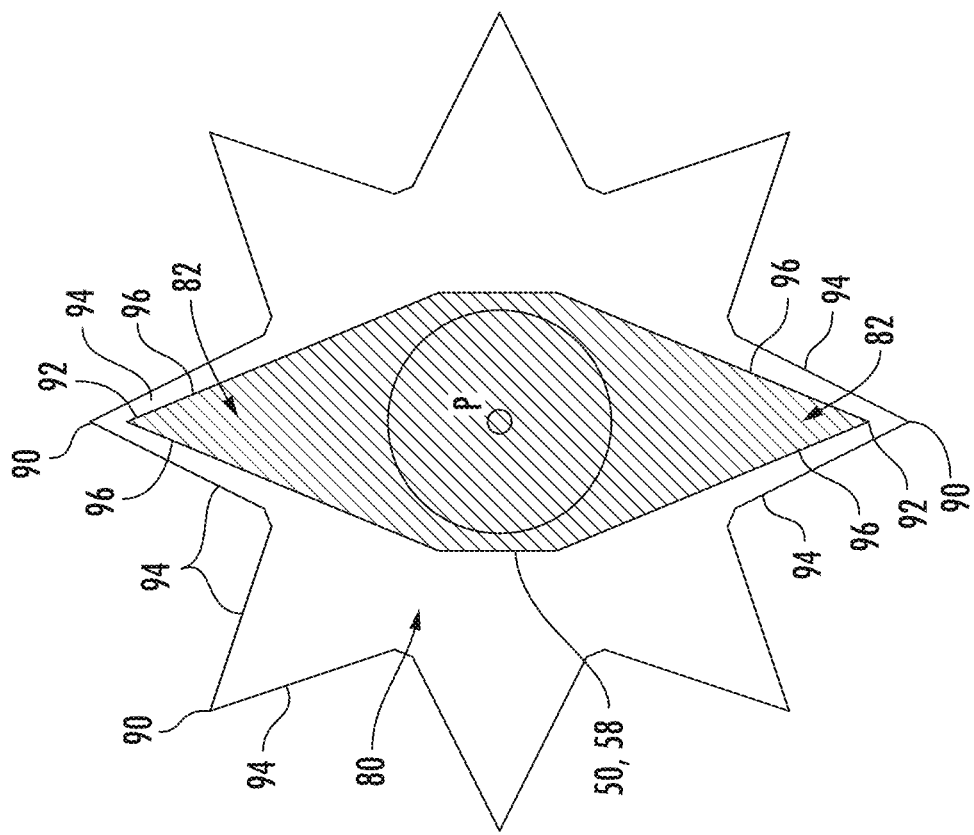
FIG. 5A is a sectional view of the interface between a single protrusion of the swing arm engaged with a single recess of the support arm according to an embodiment.

Similarly, with reference to FIG. 5B, one or more protrusions 82 having fewer sides 88 than the total number of sides 86 of the recess 80 may also be receivable within the recess 80. A recess 80 with any desired number of walls 86 could be compatible with and receive a protrusion 82 with any lesser number of walls 88 provided that the walls 88 of the of the protrusion 82 are spaced similarly to the walls 86 of the recess 80. Although the protrusion 82 in FIG. 5B is illustrated as having six sides, four of which are spaced similarly to the sides of the recess, it should be understood that a protrusion having any suitable number of sides is contemplated herein.

With continued reference to FIGS. 4A-5A, each feature 89 and portion 91, and therefore each vertex 90, 92, may be formed by a pair of walls 94, 96 extending substantially perpendicular from the first surface 46 or support surface 84 (or at some other angle in other embodiments), and arranged at a predetermined angle relative to one another. In such embodiments, the vertices 90, 92 may be oriented substantially parallel to the pivot axis P. The angle formed between the pair of walls 94, 96 may be less than 90°, and in some embodiments is less than 60°, and less than 45°. Further, adjacent features 89 of the recess 80 and adjacent portions 91 of the protrusion 82, respectively, are arranged at an angle relative to one another. The angle between adjacent features 89 and the angle between adjacent portions 91 may be based on the total number of features 89 and portions 91 and the positioning of the features 89 and portions 91 about the periphery of the openings 50 and aperture 58, respectively. In the illustrated, non-limiting embodiment, the features 89 and portions 91, and therefore the plurality of vertices 90, 92 of the features 89 and portions 91 are equidistantly spaced about the periphery of the opening 50 and aperture 58, respectively, such that the angles between adjacent features are equal and the angles between adjacent portions are equal. However, embodiments where the vertices 90, 92 are non-uniformly arranged are also contemplated herein.

Figure 10B:
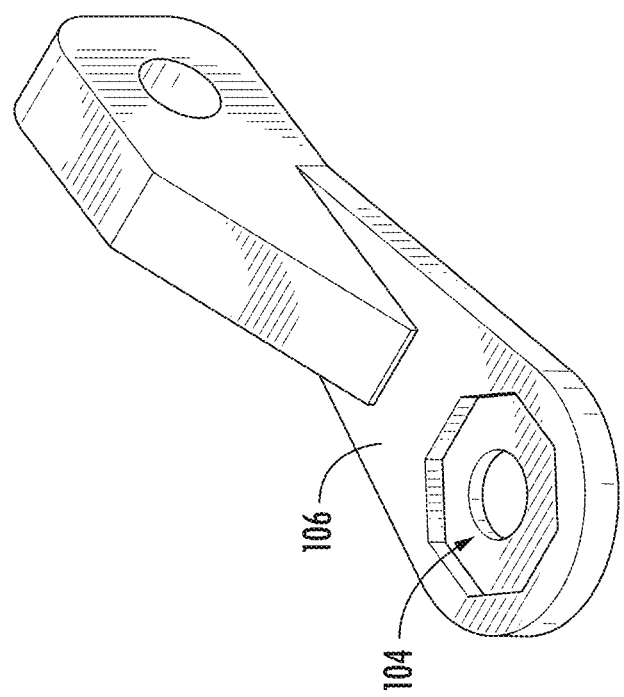
FIG. 10B is a perspective view of a support arm having a single protrusion according to an embodiment.
Figure 10A:
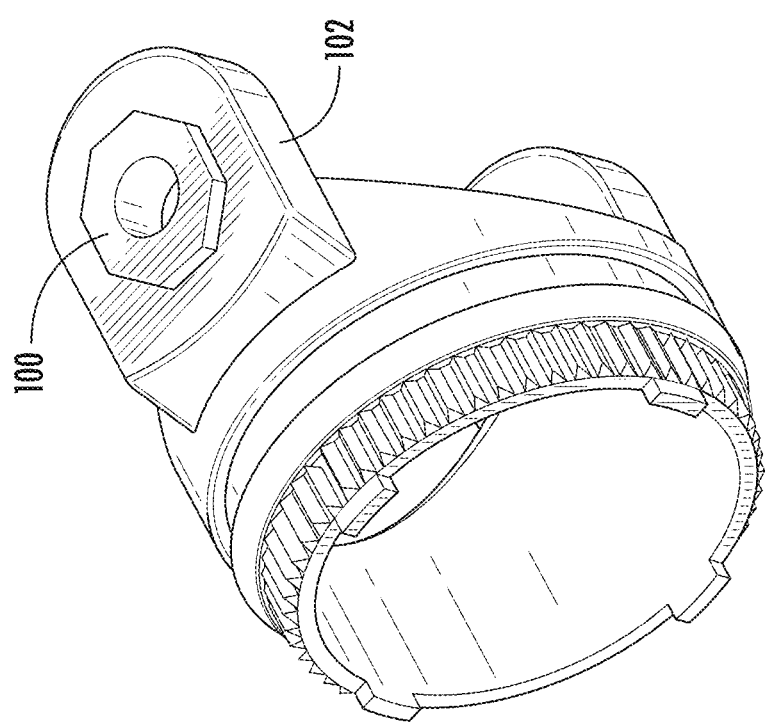
FIG. 10A is a perspective view of an adapter body having a single recess formed in a swing arm according to an embodiment.

In the embodiments of FIGS. 3A-4B, described above, the swing arm 52 includes the protrusion 82 and the support arm 44 includes the recess 80. It will be appreciated that the opposite configuration may be employed without departing from the scope of the present disclosure. For example, and with reference to FIGS. 10A-10B, a protrusion 100 is shown extending from a surface of a support arm 102 (FIG. 10A) and a complimentary recess 104 is provided on a swing arm 106 (FIG. 10B). Such reversal of the protrusion and recess may incorporate any of the various described and illustrated configurations and arrangements of the present disclosure, and the configuration shown in FIGS. 10A-10B is for illustrative purposes.

Figure 6:
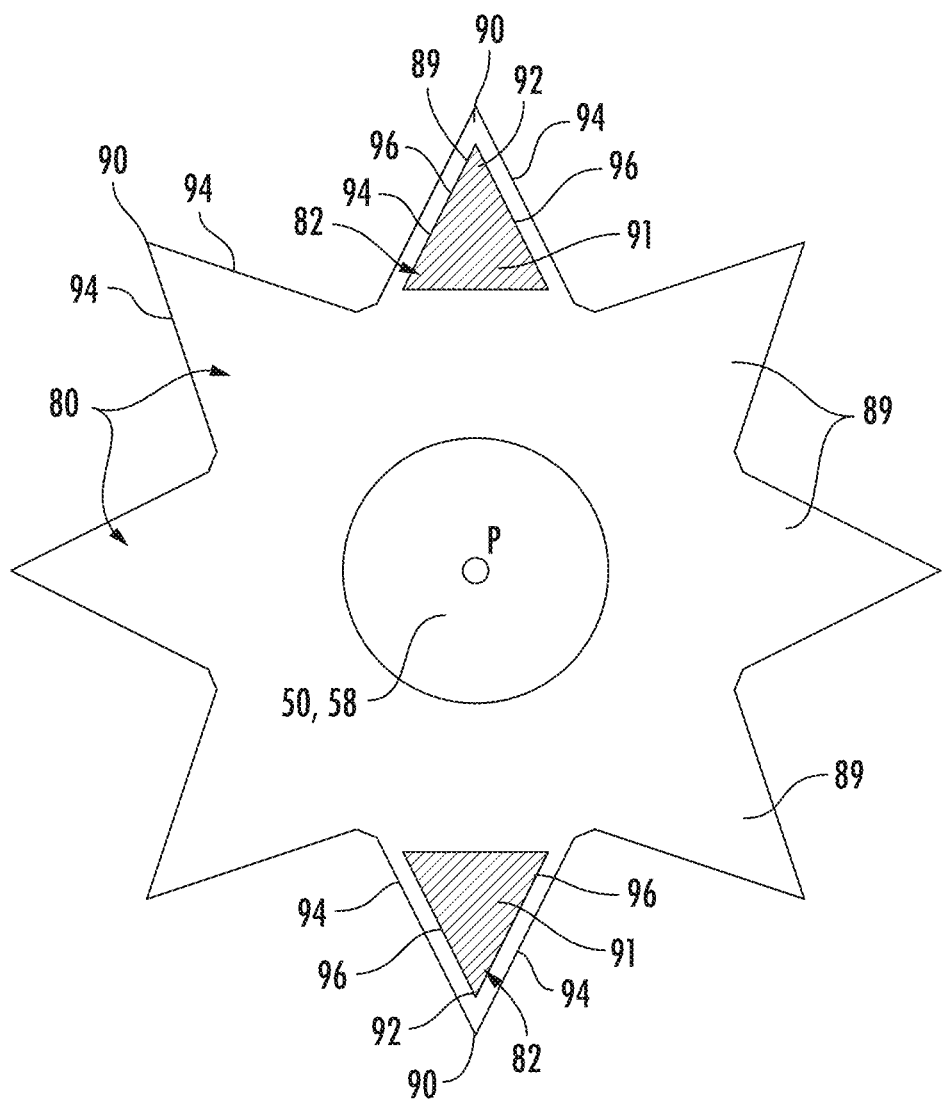
FIG. 6 is a sectional view of the interface between a plurality of protrusions of the swing arm engaged with a recess of the support arm according to an embodiment.

With reference to FIG. 6, an embodiment including a single recess 80 and a plurality of distinct protrusions 82 is illustrated. As shown, the protrusions 82 are separated or spaced apart from one another about the aperture 58. Although the protrusions 82 are illustrated as being equidistantly spaced, embodiments where the protrusions 82 are not equidistantly spaced are also contemplated herein. In the illustrated, non-limiting embodiment, the recess 80 includes a plurality of features 89, each having a vertex 90 formed at the interface between an angled pair of walls 94 as previously described. Similarly, each of the protrusions 82 has a portion 91 including a vertex 92 formed at the interface between two angled walls 96. The angle defined between the walls 96 of each protrusion 82 at the vertex 92 may be identical or may be different to the angle defined between the walls 94 of the recess 80 at a vertex 90. Although only two protrusions 82 are shown in the non-limiting embodiment, it should be appreciated that embodiments where the total number of portions 91, and therefore vertices 92 for example, is less than or equal to the total number of features 89, and therefore vertices 90 for example, of the recess 80 are also within the scope of this disclosure.

Figure 7B:
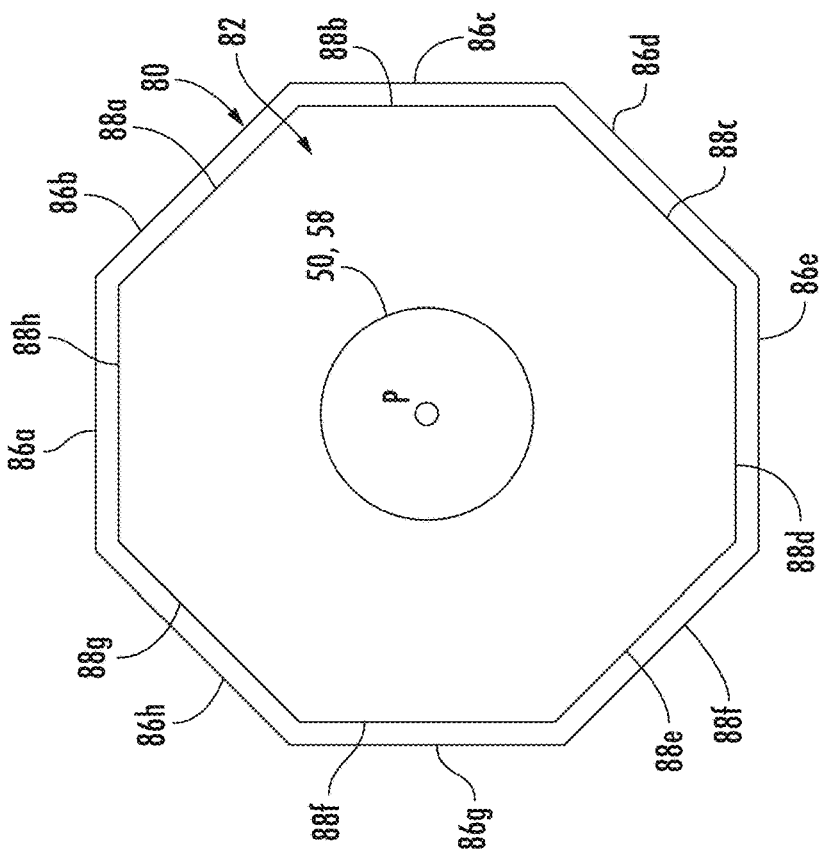
Figure 7A:
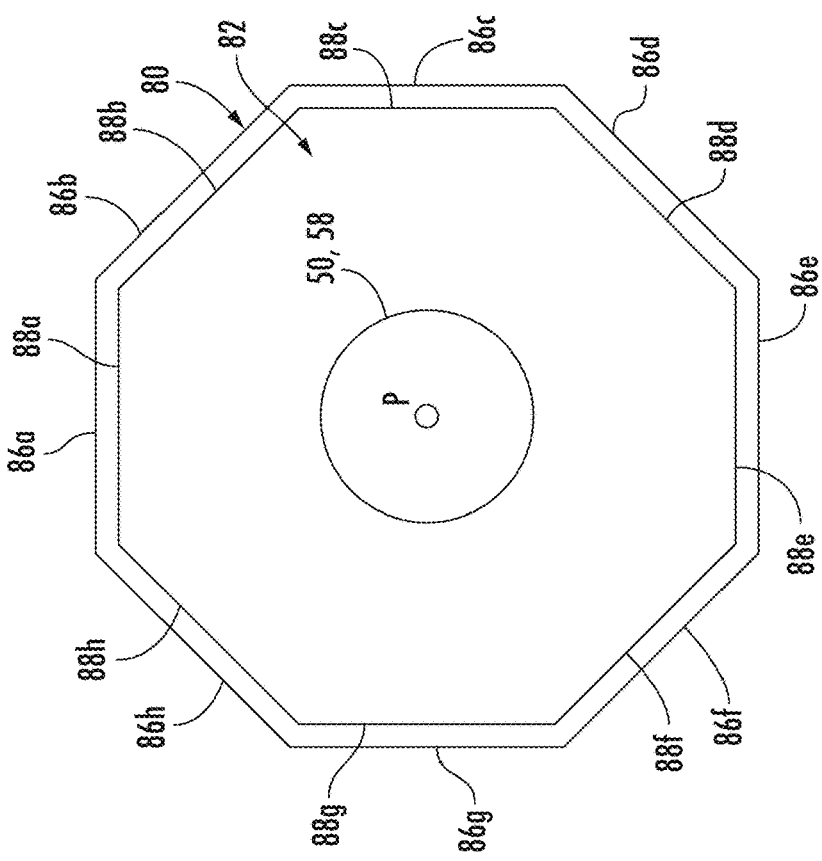

The total number of walls 86, 88 or features 89 and portions 91 of both the recess 80 and protrusion 82 may define the total number of configurations between which the swing arm 52 is transformable. With reference to FIGS. 7A-7D, a schematic diagram of the protrusion 82 of FIGS. 3A and 3B arranged within the recess 80 of FIGS. 3A and 3B in various configurations is illustrated in more detail. It should be appreciated that the clearance illustrated between the walls 88 of the of the protrusion 82 and the walls 86 of the recess 80 has been enlarged for clarity. As shown, the recess 80 includes eight walls 86a-86h, and the protrusion 82 includes eight walls 88a-88h. In a first configuration, as shown in FIG. 7A, each wall 88 of the protrusion 82 is aligned with a matching wall 86 of the recess 80 (e.g. wall 88a is aligned with wall 86a, wall 88b is aligned with wall 86b, etc.). In a second configuration, as shown in FIG. 7B, the protrusion 82 has been rotated clockwise about the pivot axis P relative to the recess 80. As a result, matching walls are no longer aligned. Rather, wall 88a is aligned with wall 86b, wall 88b is aligned with wall 86c, wall 88c is aligned with wall 86d, etc. In a third configuration shown in FIG. 7C, the protrusion 82 has again been further rotated clockwise relative to the recess 80. Accordingly, in the third configuration, wall 88a is aligned with wall 86c, wall 88b is aligned with wall 86d, wall 88c is aligned with wall 86e, etc. Similarly, in the fourth configuration shown in FIG. 7D, the protrusion 82 has again been rotated clockwise relative to the recess 80 such that the wall 88a is aligned with wall 86d, wall 88b is aligned with wall 86e, wall 88c is aligned with wall 86f, etc.

The various configurations illustrated and described herein are intended as an example only. It should be appreciated that although only four configurations are illustrated, the protrusion 82 may be further rotated relative to the recess 80 to achieve additional configurations. Further, although a protrusion 82 and recess 80 having an octagonal configuration (FIGS. 3A and 3B) are illustrated, it should be understood that other embodiments (e.g., the embodiments of FIGS. 4A, 4B, 4C, 5A, 5B, 6) may perform similarly.

It should be appreciated that each of the plurality of distinct configurations may correlate to a respective or distinct angle of the swing arm 52 relative to the support arm 44, and therefore the longitudinal axis X. For example, in a first configuration, the swing arm 52 may extend generally parallel to the longitudinal axis X, in a second configuration, the swing arm 52 may extend via clockwise rotation at a 45 degree angle to the longitudinal axis X, in a third configuration, the swing arm 52 may extend via clockwise rotation at a 90 degree angle to the longitudinal axis X, in a fourth configuration, the swing arm 52 may extend via clockwise rotation at a 135 degree angle to the longitudinal axis X, in a fifth configuration, the swing arm 52 may extend parallel to the longitudinal axis X, but rotated 180 degrees from the first configuration, in a sixth configuration, the swing arm 52 may extend via clockwise rotation at a 225 degree angle to the longitudinal axis X or via counterclockwise rotation at a 45 degree angle, in a seventh configuration, the swing arm 52 may extend via clockwise rotation at a 270 degree angle to the longitudinal axis X or via counterclockwise rotation at a 90 degree angle, and in an eighth configuration, the swing arm 52 may extend via clockwise rotation at a 315 degree angle to the longitudinal axis X or via counterclockwise rotation at a 135 degree angle. The foregoing are only some examples, and other angles are within the scope of this disclosure. Although a swing arm 52 transformable between eight different configurations is illustrated and described herein, it should be appreciated that in other embodiments, the swing arm may be configured to transform or rotate about the pivot axis P between any number of configurations, such as two configurations, four configurations, or more than ten configurations for example. As a result, the incremental change in the angle between each configuration may vary in part based on the total number of configurations of the swing arm. However, any suitable change in angle is contemplated herein. Furthermore, the change in angle between each of the configurations may be uniform or may vary. In an embodiment, the swing arm 52 may be positionable in each of the first, second, third, fourth, six, seventh and eight configurations with the fifth configuration (rotated 180 degrees) being removed from the support arm 44.

Figure 8B:
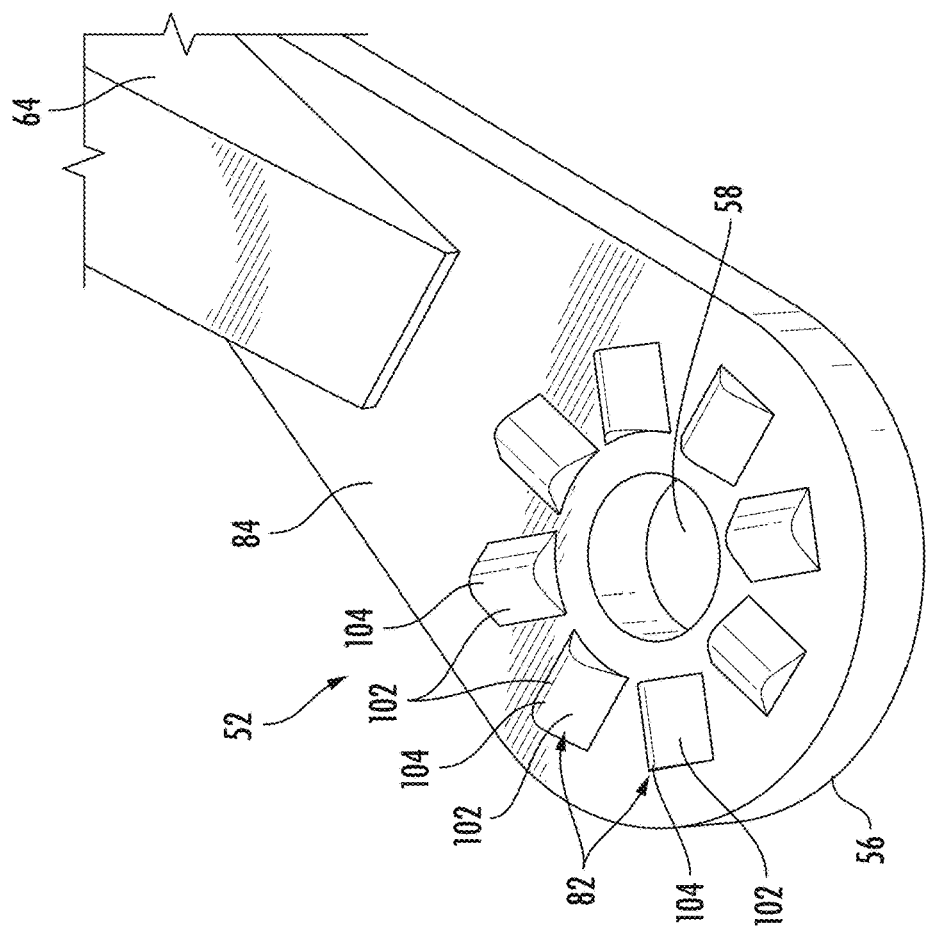
FIG. 8B is a perspective view of a swing arm having a plurality of protrusions according to another embodiment.
Figure 8A:
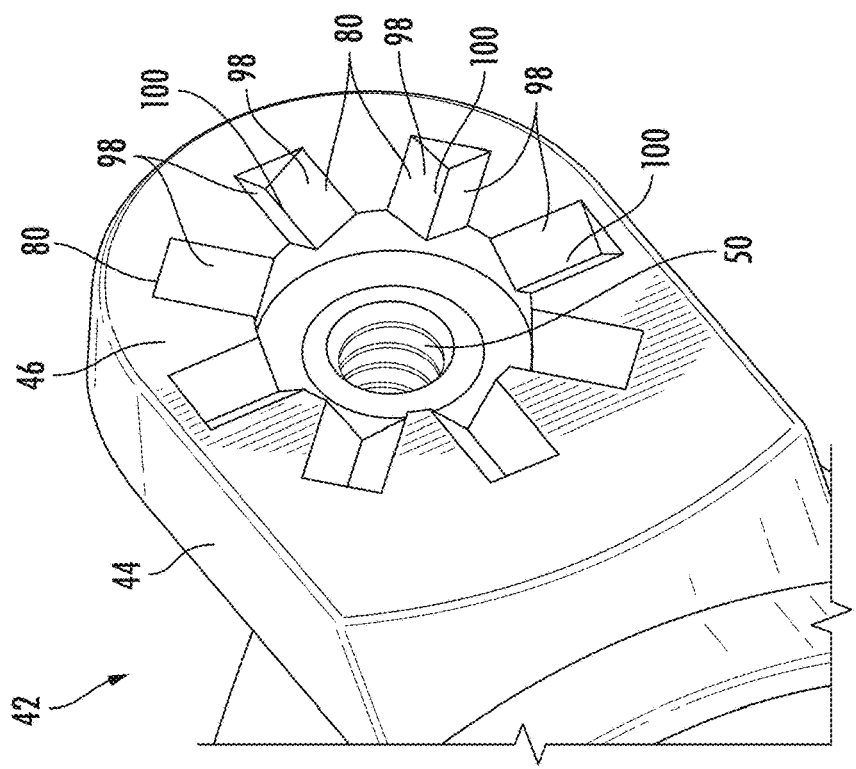
FIG. 8A is a perspective view of an adapter body having a plurality of recesses formed in a support arm according to another embodiment.
Figure 8C:
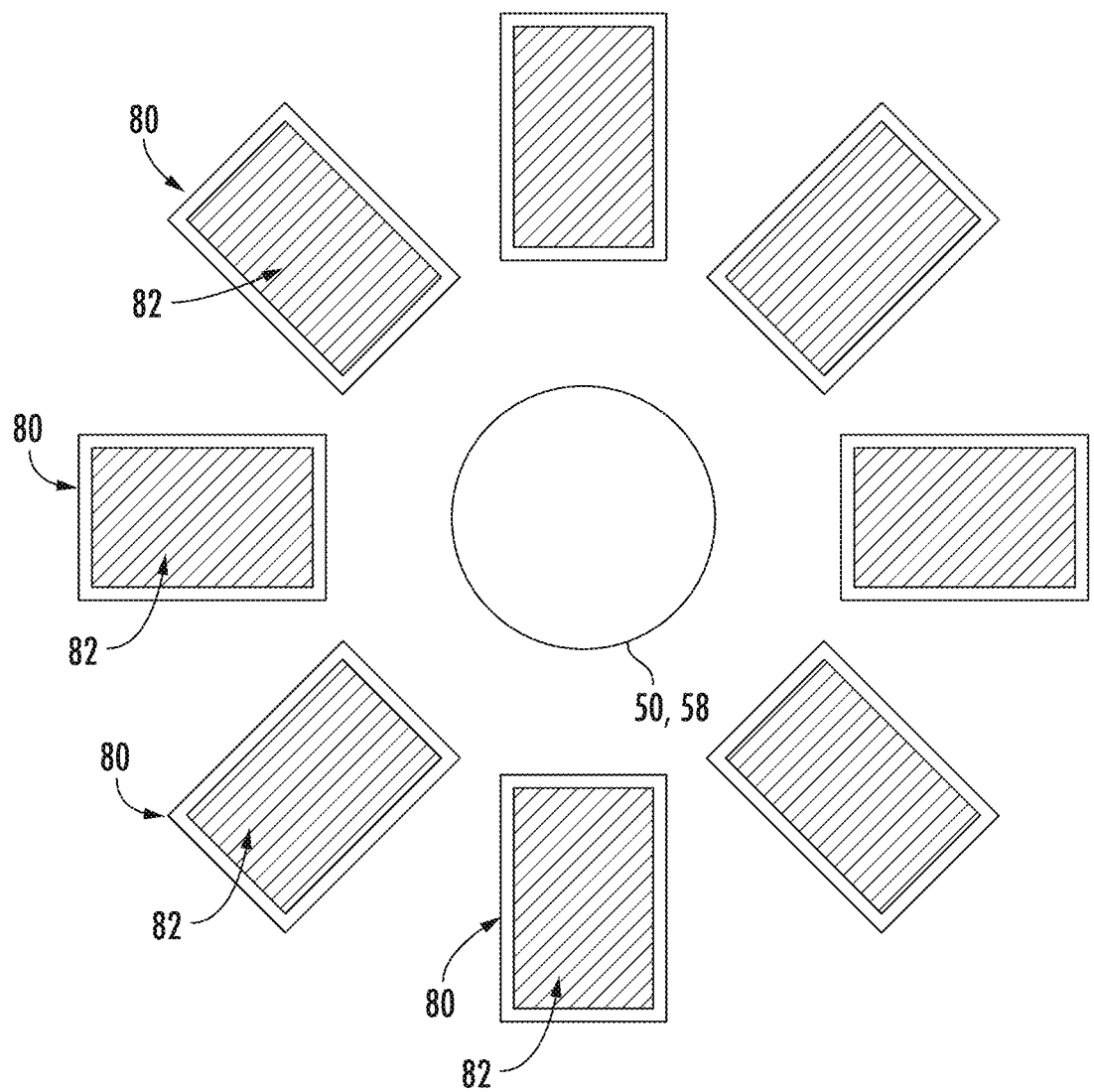
FIG. 8C is a cross-sectional view of the interface between the plurality of protrusion of the swing arm engaged with the plurality of recesses of the support arm according to an embodiment.
Figure 9:
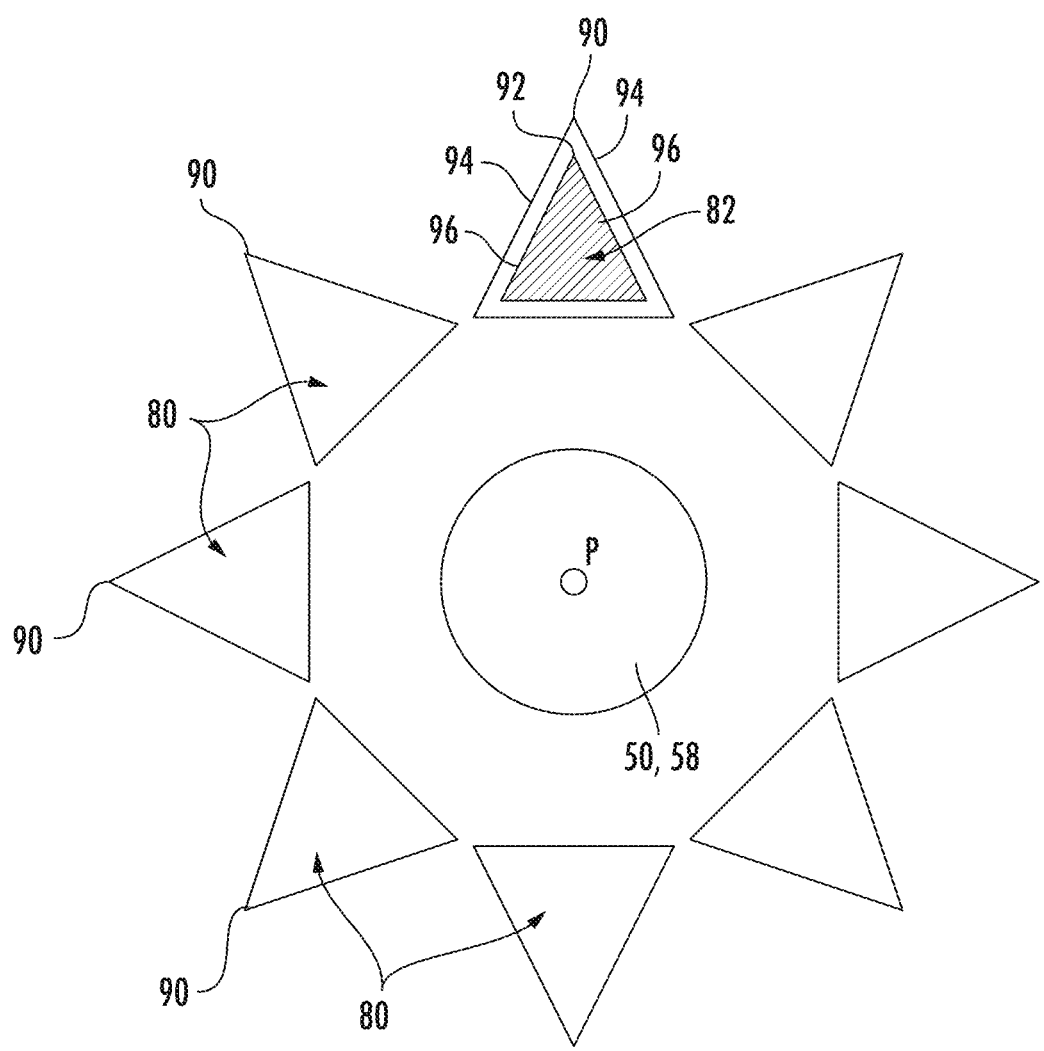
FIG. 9 is a sectional view of the interface between a protrusion of the swing arm engaged with one of a plurality of recesses of the support arm according to an embodiment.

With reference now to the non-limiting embodiment of FIGS. 8A-9, the at least one recess 80 may be a plurality of recesses 80. Each recess 80 may be located remotely or may be separated from the remainder of the plurality of recesses 80, or some of the recesses 80 may be coupled while others are separated from the remainder of the plurality of recesses 80. In such embodiments, each of the plurality of recesses 80 may, but need not be substantially identical to the other recesses 80. Alternatively, or in addition, as shown in FIGS. 8A-8C, the at least one protrusion 82 may be a plurality of protrusions 82. In embodiments including a plurality of protrusions, each protrusion 82 may be located remotely from or may be separated from the remainder of the plurality of protrusions 82, or some of the protrusions 82 may be coupled while others are separated from the remainder of the plurality of protrusions 82. In such embodiments, each of the plurality of protrusions 82 may, but need not, be substantially identical.

Although a support arm 44 having eight recesses 80 and a swing arm 52 having eight protrusions 82 is illustrated in FIGS. 8A-8C, it should be understood that embodiments having any number of recesses 80 and a corresponding number of protrusions 82, such as two, three, four, five, six, seven, or more than eight are also within the scope of this disclosure. It should also be understood that the total number of recesses 80 may, but need not, equal the total number of protrusions 82. For example, a support arm 44 may include a plurality of recesses 80 and a corresponding swing arm 52 may include only a single protrusion 82, as shown in FIG. 9. Embodiments including fewer protrusions 82 than recesses 80 are within the scope of this disclosure. It should be appreciated that although the plurality of recesses 80 and the single protrusion 82 illustrated in FIG. 9 have a configuration similar to that described with respect to FIGS. 4A-4C, a recess 80 and one or more corresponding protrusion 82 having any suitable or complementary configuration is within the scope of this disclosure.

In an embodiment, such as shown in FIGS. 8A-8C, the sides or walls 98 of the at least one recess 80 may extend at a perpendicular or non-perpendicular angle relative to the first surface 46. In the illustrated, non-limiting embodiment, each recess 80 includes a first wall 98 arranged at a first non-perpendicular angle relative to the first surface 46 and a second wall 98 arranged a second non-perpendicular angle relative to the first surface 46 resulting in a generally triangular shaped recess 80. A distal end of the first wall 98 may intersect or abut the distal end of the second wall 98 at a vertex 100. The vertex 100 may have a linear configuration. In other embodiments, the first and second walls 98 may be truncated such that the vertex 100 connecting the distal ends of the first and second wall 98 has a curved configuration. As shown, the vertex 100 may be arranged generally parallel to the first surface 46. In an embodiment, the recess 80 is symmetrical about the vertex 100, but in other embodiments the recess 80 need not be symmetrical about the vertex 100.

The at least one protrusion 82 similarly may extend at a perpendicular or a non-perpendicular angle relative to the support surface 84. Each protrusion 82 may include a first wall 102 arranged at a first angle relative to the support surface 84 and a second wall 102 arranged at a second angle relative to the support surface 84 such that a vertex 104 is formed between the first and second walls 102. The first and second angles may be equal or unequal. As noted above, the vertex 104 may have a linear configuration. Alternatively, the walls 102 may be truncated such that the vertex 104 is configured as a wall, rather than as a two-dimensional line. In such embodiments, the vertex wall may have a curved configuration, a planar configuration, or any other suitable configuration. The angles of the first and second walls 102 of the protrusion 82 are generally complementary to the angles of the first and second walls 98 of the recess 80 such that the protrusion 82 is receivable within the recess 80.

To transform a swing arm 52 relative to the support arm 44 between the plurality of different configurations, a force is applied to the swing arm 52, represented by arrow F in FIG. 1, in a direction away from the support arm 44, such as perpendicular to the first surface 46 of the support arm 44. In embodiments that include a biasing member, the force opposes the biasing force of the biasing member 62, thereby moving the at least one protrusion 82 extending from the support surface 84 of the swing arm 52 out of engagement with the at least one recess 80 formed in the first surface 46 of the support arm 44. Once disengaged, the swing arm 52 can be rotated about the pivot axis P, to a desired configuration. Once the swing arm 52 has reached the desired configuration (and position or angle relative to the support arm 44), the force F may be removed. Upon removal of the force, the biasing force of the biasing member 62 will urge the at least one protrusion 82 into engagement with the at least one recess 80 in the desired position and angle relative to the longitudinal axis X.

In embodiments without a biasing member, the fastener 60 is loosened and the swing arm 52 is moved away from the support arm 44, for example in the direction of arrow F in FIG. 1, thereby moving the at least one protrusion 82 extending from the support surface 84 of the swing arm 52 out of engagement with the at least one recess 80 formed in the first surface 46 of the support arm 44. Once disengaged, the swing arm 52 can be rotated about the pivot axis P, to a desired configuration. Once the swing arm 52 has reached the desired configuration (and position or angle relative to the support arm 44), the swing arm 52 is brought into engagement with the support arm 44 such that the at least one protrusion 82 engages with the at least one recess 80 to hold the swing arm 52 in the desired position and angle relative to the longitudinal axis X. When the at least one protrusion 82 is engaged with the at least one recess 80 in the desired position, the fastener 60 may be tightened to limit movement of the swing arm 52 out of engagement with the support arm 44. By positioning the swing arms 52 relative to the adapter body 22 and the longitudinal axis X at a plurality of distinct configurations or positions, the cable or conductor enclosed by the saddle bars 68 coupled to the swing arms may be desirably routed relative to the adapter body 22 and held in a desired position with respect to the connector.

In embodiments that include a single protrusion 82, a single recess 80, or a combination of a single recess 80 and a single protrusion 82, the need to simultaneous align several protrusions with several different recesses has been eliminated. As a result the swing arm 52 is more easily transformable between various configurations.

The terms "generally" substantially" and "about" are intended to include a degree of error such as commonly associated with manufacturing tolerances or with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A backshell adapter assembly comprising:
a coupling member;
a ferrule positionable at least partially within the coupling member;
an adapter body including at least one support arm;
at least one swing arm connectable to said at least one support arm, said at least one swing arm being positionable relative to said at least one support arm at a plurality of distinct configurations; and
a threaded fastener configured to releaseably secure the at least one swing arm to the at least one support arm in each of the plurality of distinct configurations, wherein in a secured state the threaded fastener is configured to limit relative movement between the at least one swing arm and the at least one support arm and prevent disengagement between the at least one swing arm and the at least one support arm,
wherein one of said at least one support arm and said at least one swing arm defines a single respective recess formed therein and the other of said at least one support arm and said at least one swing arm comprises a single respective protrusion extending therefrom, said single protrusion being receivable within said single recess, wherein said single recess and said single protrusion define the plurality of distinct configurations, wherein the single respective protrusion is integrally formed with the respective swing arm or support arm and extends from a surface thereof, and
wherein a configuration of said single recess is identical to a configuration of said single protrusion such that the single protrusion is receivable within the single recess.

2. The backshell adapter assembly of claim 1, wherein said plurality of different configurations are arranged about a pivot axis.

3. The backshell adapter assembly of claim 1, wherein said at least one swing arm is positionable relative to said at least one support arm between eight configurations.

4. The backshell adapter assembly of claim 3, wherein said adapter body has a longitudinal axis, and said at least one swing arm is arranged at a distinct angle relative to said longitudinal axis in each of said plurality of different configurations.

5. The backshell adapter assembly of claim 1, wherein said single recess is polygonal in shape.

6. The backshell adapter assembly of claim 5, wherein said single recess is octagonal in shape.

7. The backshell adapter assembly of claim 5, wherein said single recess is a star shape including a plurality of identical radially extending features.

8. The backshell adapter assembly of claim 1, wherein said single recess is formed in an outwardly facing surface of said at least one support arm.

9. The backshell adapter assembly of claim 1, wherein said single recess is formed in an inwardly facing surface of said at least one support arm.

10. The backshell adapter assembly of claim 1, wherein said at least one support arm includes a plurality of support arms, and said at least one swing arm includes a plurality of swing arms.

11. The backshell adapter assembly of claim 1, wherein said single protrusion is a star shape including a plurality of substantially identical radially outwardly extending portions.

12. A backshell adapter assembly comprising:
an adapter body including at least one support arm; and
at least one swing arm connectable to said at least one support arm, said at least one swing arm being positionable relative to said at least one support arm at a plurality of distinct configurations, said at least one swing arm having a support surface defining a planar surface and an aperture defined through the at least one swing arm;
a plurality of protrusions extending from said planar support surface, wherein each protrusion of the plurality of protrusions includes a plurality of walls, and at least one of said plurality of walls is arranged at a non-perpendicular angle to said planar support surface, and
a threaded fastener configured to releaseably secure the at least one swing arm to the at least one support arm in each of the plurality of distinct configurations, wherein in a secured state the threaded fastener is configured to limit relative movement between the at least one swing arm and the at least one support arm and prevent disengagement between the at least one swing arm and the at least one support arm,
wherein the plurality of protrusions are arranged in an equidistant circular orientation spaced about said aperture and each protrusion is separated from an adjacent protrusion by a portion of the planar surface.

13. The backshell adapter assembly of claim 12, wherein said plurality of walls further comprises a first wall arranged at a first non-perpendicular angle relative to said support surface and a second wall arranged at a second non-perpendicular angle relative to said support surface.

14. The backshell adapter assembly of claim 13, wherein a vertex is formed between said first wall and said second wall.

15. The backshell adapter assembly of claim 14, wherein said vertex has a linear configuration.

16. The backshell adapter assembly of claim 14, wherein said first wall and said second wall are truncated and said vertex is a vertex wall extending between said first wall and said second wall.

17. The backshell adapter assembly of claim 14, wherein said vertex wall has a curved configuration.

18. The backshell adapter assembly of claim 14, wherein said vertex wall is has a planar configuration.

19. The backshell adapter assembly of claim 13, wherein said plurality of protrusions are identical in shape and size to each other.

20. The backshell adapter assembly of claim 12, wherein said at least one support arm comprises a plurality of recesses, each of said plurality of recesses being identical and configured to receive a corresponding protrusion of the plurality of protrusions.

* * * * *